Aug. 19, 1930.    O. F. LUNDELIUS    1,773,313
SPRING MOUNTING
Filed Dec. 13, 1926    6 Sheets-Sheet 1

Inventor
Oscar F. Lundelius

Attorney.

Aug. 19, 1930.  O. F. LUNDELIUS  1,773,313
SPRING MOUNTING
Filed Dec. 13, 1926    6 Sheets-Sheet 3

Inventor
Oscar F. Lundelius
Attorney.

Aug. 19, 1930.   O. F. LUNDELIUS   1,773,313
SPRING MOUNTING
Filed Dec. 13, 1926   6 Sheets-Sheet 4

Inventor
Oscar F. Lundelius

Attorney.

Aug. 19, 1930.　　　O. F. LUNDELIUS　　　1,773,313
SPRING MOUNTING
Filed Dec. 13, 1926　　　6 Sheets-Sheet 5

Fig 10.

Inventor.
Oscar F. Lundelius
Attorney.

Aug. 19, 1930. O. F. LUNDELIUS 1,773,313
SPRING MOUNTING
Filed Dec. 13, 1926 6 Sheets-Sheet 6

Fig. 13.

Inventor
Oscar F. Lundelius

Attorney.

Patented Aug. 19, 1930

1,773,313

UNITED STATES PATENT OFFICE

OSCAR F. LUNDELIUS, OF LOS ANGELES, CALIFORNIA, ASSIGNOR TO LUNDELIUS & ECCLESTON MOTORS CORPORATION, OF LAS VEGAS, NEVADA, A CORPORATION OF DELAWARE

SPRING MOUNTING

Application filed December 13, 1926. Serial No. 154,382.

This invention relates to vehicular spring mountings and is more particularly concerned with mountings used in conection with spring suspension systems wherein connections between vehicle bodies and wheels are made directly through springs rather than through rigid axles.

By the use of such a system, unsprung weight may be reduced to a minimum, for axles are eliminated and differentials and other elements ordinarily carried by the rear axles may be mounted rigidly on the vehicle frame and be capable of vertical movement with respect to the wheels, the drive from the differential gearing to the wheels being accomplished through sectional shafts connected by suitable universal joints.

As it is well known that the reduction of unsprung weight is accompanied by a corresponding reduction of wear upon power plants, transmission elements, running gear, tires, etc., there is no need of discussing here the advantages to be derived from this general type of spring suspension system.

The mounting has been devised primarily for the purpose of providing a simple, sturdy and highly efficient connecting means between a vehicle frame and one or more spring members by which the frame is sprung from traction wheels. The mounting provides means for arranging or grouping the several spring members in a manner whereby certain beneficial results are obtained from the spring members individually and collectively.

The mounting may be used to special advantage in connection with a spring system of the type disclosed in a patent granted to me on May 16, 1926, No. 1,576,920 on "spring mountings," wherein the symmetrical arrangement of the springs and their connections about horizontal and/or vertical axial planes is explained as being of great benefit. However, it is not to be considered that the present invention is limited to a spring system having such symmetry or to the particular type of mounting there illustrated and described.

The mounting described herein also provides a supporting structure for directly carrying the differential or other power transmitting elements or the use of such elements as parts of the suspension system for the springs.

One of the particular features of the present invention, especially as compared to the structure shown in said patent, lies in the simplified form of connection between the suspension element and the springs. there being utilized no moving parts or any parts which have to be machined or finished with a particular degree of accuracy. Furthermore, these connections are such that a given spring is capable of free flexure throughout its length, in spite of the fact that it is held to the suspension members at two longitudinally spaced points therealong. In other words, in spite of the necessity of holding the spring intermediate its ends with respect to the frame. the full extent of the spring is had advantage of when road shocks are encountered, an obvious advantage. The connection means, however, is such that it has a snubbing effect when rebound occurs, this snubbing effect calling for no extra parts but being gained merely by virtue of the formation of the boxes by which the springs are held to the suspension elements.

Other very important features of my invention are the fashioning of the spring supporting elements so they are adapted to withstand severe service conditions, and in fashioning the assembly in such a manner that it may be applied or dismounted in whole or in part with minimum expenditure of time and labor.

Other features of novelty and objects of the invention will be made apparent in the following detailed description, reference being had to the accompanying drawings, in which.

At the outset, I wish to make the reservation that while I have shown the several springs as arranged with certain symmetry, that the present invention is in no way limited to such symmetrical arrangement, and that certain features of the invention are applicable to a system embodying a lesser number of springs in each unit. Furthermore, certain features may be embodied in the mounting of a single spring. Therefore, except for such claims as definitely set forth a predetermined number or arrangement of spring members, the claims are to be considered entirely unlimited as regards number or relative arrangement of springs.

The general principles of the mounting may be applied with equal advantage either to the front or rear suspension of the vehicle, there being necessary only comparatively few structural changes between the front and rear end equipment. I have illustrated both applications but will first describe the general make-up of the conventionally illustrated spring supported vehicle frame. The frame is generally indicated at 10 and includes channel side rails 11, channel end rail 12, and cross braces 13, 14, 15 and 16; braces 14 and 15 (Fig. 7) preferably being of channel cross section, and members 12 and 14 preferably dropping centrally as at 12ª and 14ª, respectively.

I will first describe the rear spring suspension unit generally indicated at 17. There are here shown four springs 18, 19, 20 and 21 which, together with their hangers or supports, are symmetrically arranged about substantially vertical and horizontal axial planes, whereby the stresses and strains arising from road shocks, traction, etc., are uniformly distributed through the springs and their mountings rather than being concentrated on any one or less than the whole number of springs or mountings, an obvious advantage. However, this showing of a definite number of springs and the symmetrical arrangement thereof is in no way to be considered as limitative on the invention, for it will be apparent that a lesser number of springs may be provided or that the spring arrangement may be different from that shown without departing from the spirit and scope of my broader claims.

It will be noted that unit 17 extends to the rear of frame 10 and that the assembly generally indicated at 22 provides a rigid supporting connection between said frame and unit 17. This connection also provides a rigid supporting connection between the frame and differential housing 23, it following that said differential housing and its associated mechanism are spring-supported rather than being carried as unsprung weight.

The spring mounting making up a part of unit 17 includes fore and aft suspension plates 24 and 25, respectively, which are spaced apart in the direction of the longitudinal axis A of frame 10, and these plates each support a pair of upper spring boxes or hangers 26, 26ª, and a pair of lower spring boxes or hangers 27, 27ª. The upper boxes of a given plate are spaced equally from vertical axial plane A' (Fig. 4) and the lower boxes preferably directly underlie the associated upper boxes. As will be made apparent later, connection is made between plates 24, 25, by assembly 22 and said plates, in turn, are connected to opposite sides of housing 23, the housing thus being connected to frame 10 through the plates and assembly 22.

From the above it will be seen that the boxes or hangers may be considered as being mounted on the differential housing, the housing thus acting as a spacer for the plates and boxes, and therefore, in effect, serving as an element of the spring supporting structure. To make the boxes integral with the differential housing would not, therefore, depart from the spirit and scope of my invention and claims. In this connection, it may also be noted that the suspension plates 24 and 25 may be considered as a part of the supporting connection between frame 10 and housing 23.

Figure 13:
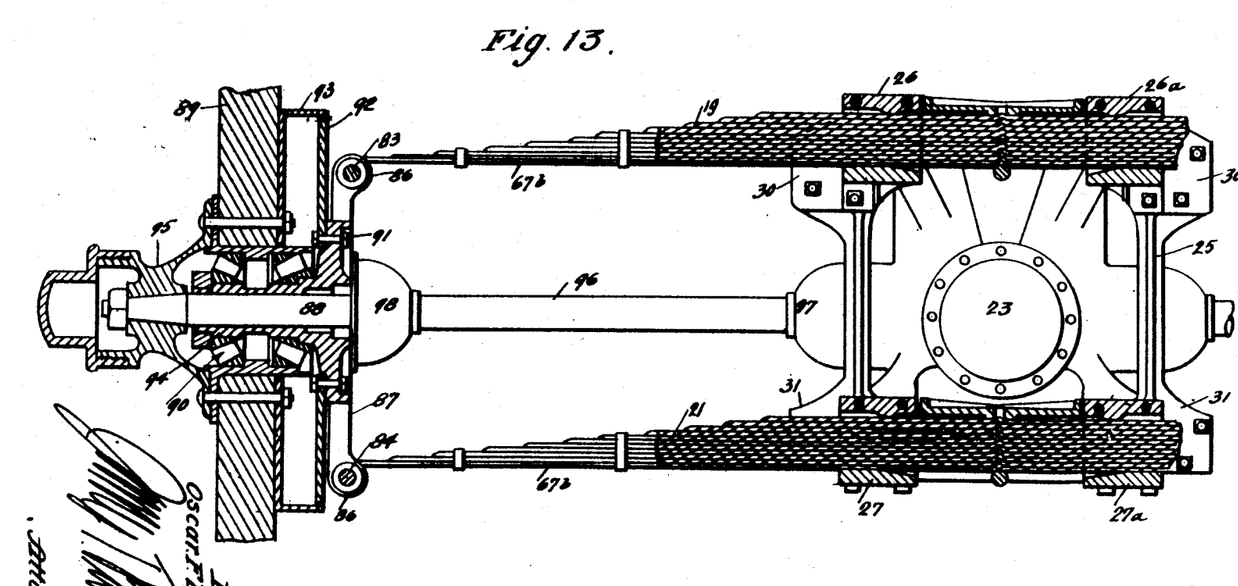
Fig. 13 is an enlarged section on line 13—13 of Fig. 2.

Plates 24 and 25 are preferably of skeleton construction, plate 24 being of substantially circular form having diametrically opposed horizontal extensions 28 with angularly turned, terminal flanges 29, (Fig. 11) and plate 25 (Fig. 13) being of rectangular formation having upper and lower ears 30 and 31, respectively, extending therefrom.

Supporting connection 22 embodies a pair of identical supports 22ª, these being arranged symmetrically with relation to axis A and each embodying a rearwardly and inwardly inclining channel arm 32 which is fastened at its forward end 33 to a frame rail 11 and extends at its rearward end through cut 34 in the web of channel 12. Preferably, said web is turned back at 35 adjacent cut 34, said turned back portion being riveted to web 36 of arm 32, and the flanges of the arm being riveted at 37 to the flanges of channel 12. Secured at 38 within the channel of arm 32 is connection casting 39 which is substantially T-shaped, the leg 40 thereof engaging the inner side of web 36 and the head 40ª extending to the rear of the arm and presenting rearward face 41 which has an integral, horizontally extending key 42 projecting therefrom. This key is adapted to fit in the horizontal way 43 provided in the forward face 44 of yoke member 45, and bolts 46 serve to tie said yoke rigidly to head 40ª, the interfitting of keys 42 and ways 43 taking considerable of the load strain from bolts 46.

Extending horizontally inward from yoke 45 near its forward end is a rectangular boss 47 having a vertically cut keyway 48. The outer face of plate flange 29 engages the inner face of boss 47 (Fig. 11), said boss and flange being rigidly tied to one another by bolts 49, and flange 29 has a vertically extending key 50 fitting within keyway 48. This interfit takes much of the torsional strain from bolts 49.

The terminals of upper and lower yoke arms 51 and 52, respectively, are bolted to plate ears 30 and 31, at 53 and 54, respectively. As shown clearly in Fig. 12, differential housing 23 carries arms 54ª which are bolted to the inner faces of plates 24 and 25 at 55. It will thus be seen that arms 32, castings 39 and yokes 45 serve together as a supporting connection between frame 10 and plates 24, 25, and also between frame 10 and housing 23. The web of end rail 12 is apertured at 56 to take the propeller shaft housing 57ª, the propeller shaft 58ª extending in the usual manner to the differential mechanism (not shown) within housing 23.

Figures 4, 6, 11:
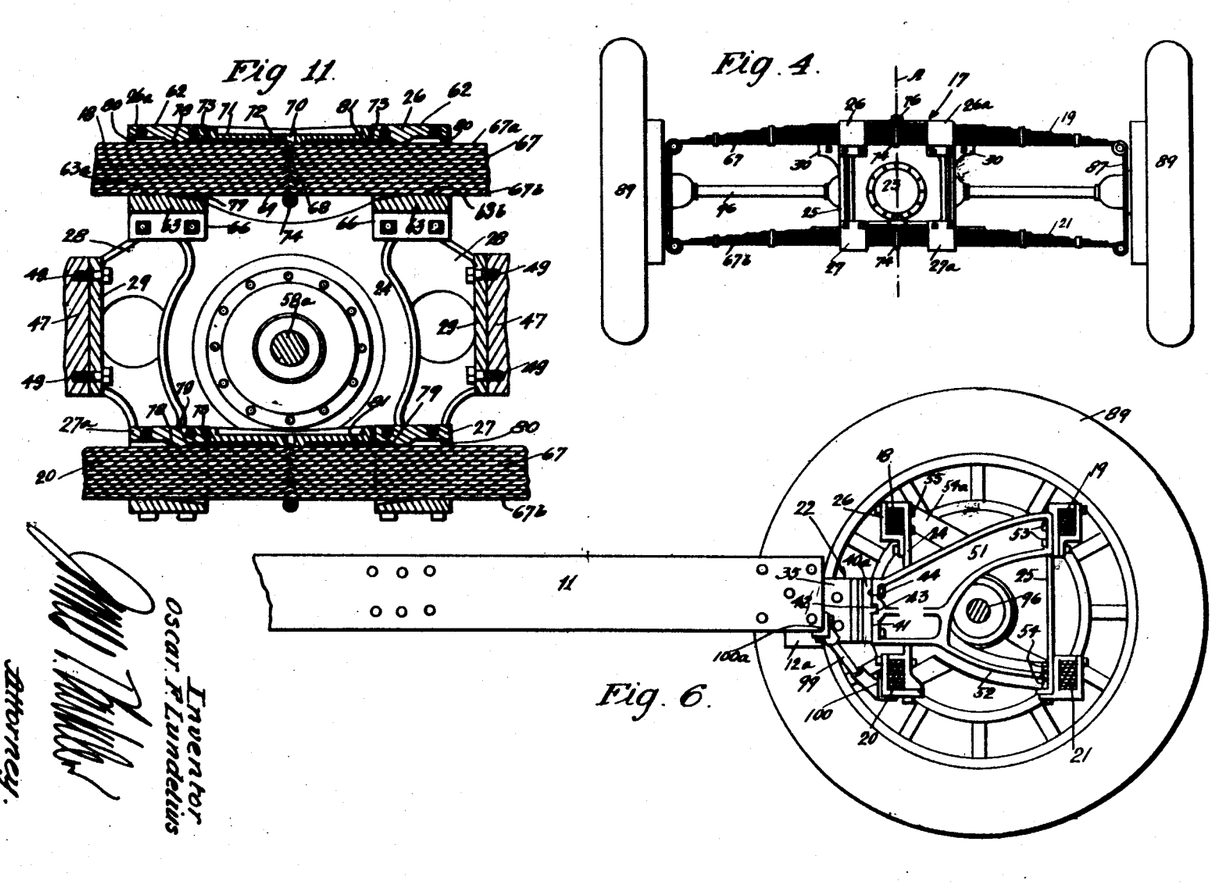
Fig. 4 is a reduced view of Fig. 2 as viewed from the right thereof.
Fig. 6 is a section on line 6—6 of Fig. 2.
Fig. 11 is an enlarged section on line 11—11 of Fig. 2.

Each pair of axially alined spring boxes or hangers is identic in construction, and I therefore will describe but one in detail, choosing for this purpose the upper boxes 26 and 26ª on plate 24 (Fig. 11). Each of these boxes defines a substantially rectangular opening 57 (Fig. 12) the opposed, vertical defining walls being the forward face 58 of plate 24 and the inner face 59 of the vertical arm 60 of demountable, angular cap 61. The top and bottom walls of the opening 57 are defined by horizontal plate flange 62 and the horizontal arm 63 of cap 61, respectively. Said cap is removably fixed to the plate by bolts 64 and 65, the former passing through arm 60 into flange 62, and the latter passing through depending cap-flanges 66 into plate 24.

Spring 18 is made up of a plurality of leaves 67, the leaf assembly being centered between boxes 26, 26ª, and having the usual central, inter-fitting nibs 68 and recesses 69, this interfit being adapted to prevent appreciable relative longitudinal movement of the leaves. The nib 68ª on the uppermost leaf 67ª is adapted to enter the central aperture 70 provided in positioning block 71, the latter having a central depending lug 72 resting on top leaf 67ª, and the ends of the block opposing the inner, opposed faces 73 of flanges 62. A U-bolt 74 is passed about leaves 67 and its ends extend through lugs 75 on the blocks (see Fig. 2) there being nuts 76 threaded on the ends of the U-bolt above the lugs and adapted to be taken up to hold the spring centrally compressed and to tie the block to the spring. While the block 71 is capable of vertical movement between flanges 62, said flanges limit the longitudinal movement thereof and consequently hold the spring in centered position.

The upper faces 63ª of cap arms 63 preferably incline downwardly and inwardly as at 77 from about their centers, while lugs 78 depend from flanges 62 into engagement with the upper leaf 67ª. Said lugs preferably are arcuate or somewhat rounded at their ends and extend inwardly from about the centers of flanges 62 to points 79 spaced from the flange edges 73. Preferably, the clearance recesses 80 at the outer sides of the boxes are of greater vertical extent as well as of greater longitudinal extent than reliefs or recesses 81 at the inner sides of the boxes.

By virtue of this arrangement, it will be seen that the mounting between plate 24 and spring 18 may be considered as of a pivotal nature, for when the outer ends of the spring are flexed upwardly, as occurs when the spring-supported wheels encounter road obstacles, said spring may have pivotal movement about lugs 78, the central portion of the spring, that is, the extent between boxes, bowing downwardly, and the spring thus being effective throughout its length, to obvious advantage. If only one end of the spring be directly flexed, the other end is flexed somewhat by reaction, and full working and advantage of the spring is thus had.

On rebound movements or where the ends of spring 67 tend to move downwardly by reason of road depressions, the horizontal portions 63ᵇ of faces 63ª check this rebound or lowering spring movement to a considerable degree, though clearances 81 allow a slight reverse flexure of the spring between boxes in order that the spring may not be over-strained. This checking or rebound snubbing action is thus gained without the use of elements extraneous to the mounting, rather being gained by the peculiar formation of the spring hangers or boxes, and the accomplishment of this action without independent snubbing mechanism is a feature of great merit, as will be readily understood.

Figures 2, 12:
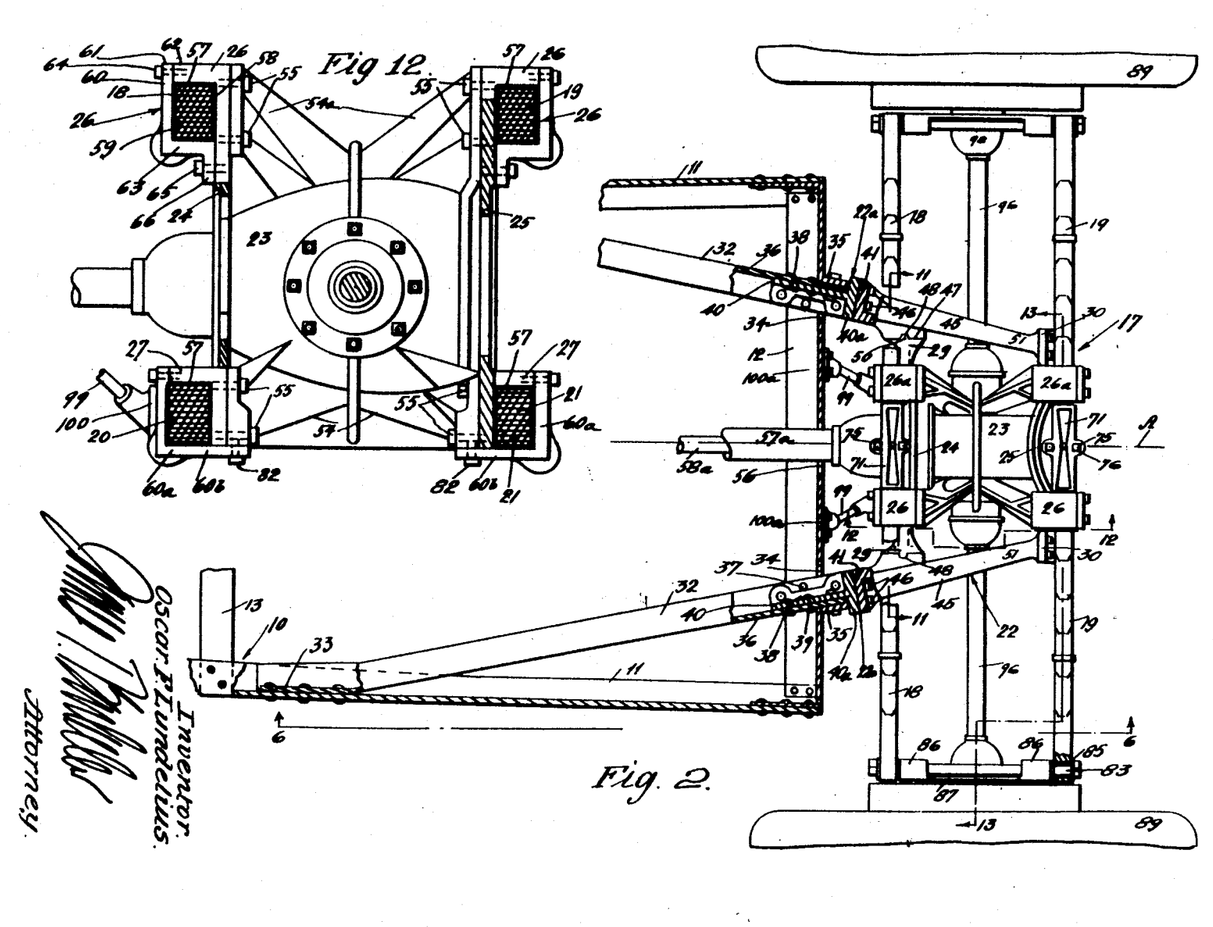
Fig. 2 is a plan view, partially in section. of the rear end of a vehicle frame to which an embodiment of my invention has been applied.
Fig. 12 is an enlarged section on line 12—12 of Fig. 2.

The mounting of the lower spring 20 is practically identical to the upper, except that an additional tie is had between boxes 27, 27ª and differential housing 23, in that the horizontal arms 60ᵇ of box caps 60ª extend beneath said housing and are bolted thereto as at 82 (Fig. 12). As before stated, the mounting of the springs on plate 25 are, in effect, identical with those just described in connection with plate 24.

The ends of spring leaves 67[b] which are here shown as the lowermost leaves, though this is not in any way to be considered as limitative, have pivotal mounting on the horizontally extending, vertically spaced pins 83 and 84, there preferably being provided bushings 85 between said pins and spring ends (Fig. 2). Pins 83 and 84 are supported in the horizontally spaced bosses 86 on vertical wheel plate 87, said plate preferably, though not necessarily, carrying integral spindles 88 upon which one of the rear wheels 89 is mounted through usual roller bearings 90. Plate 87 preferably also has attached thereto at 91 a circular plate 92 adapted to support usual internal, expanding brake means (not shown) adapted to coact with brake drum 93 on wheel 89. Wheel shaft 94 is drivingly connected to wheel 89 through hub 95, and the shafts of the two wheels are drivingly connected by drive shafts 96 to the differential mechanism, (not shown) within housing 23, universal joints 97 and 98 being interposed in the driving connection in order to allow for the disalinement of the differential and wheel shafts 94.

Though this is not essential to the invention and may usually be dispensed with, I sometimes provide torque rods 99 between the spring suspension unit and frame 11. For instance, said rods may be secured at their lower ends to the lower caps 60[a] on plate 24 at 100, and at their upper ends 100[a] to end rail 12.

The spring mounting at the forward end of the vehicle is generally similar to that just described, except that in place of two longitudinally spaced suspension plates, there is provided a single suspension plate 101 disposed centrally between side rails 11 and secured directly at 102 to the cross-frame member 15. Said cross-member is of channel cross-section and the rear face of plate 101 is provided with vertically spaced flanges 103 defining a way 104 adapted to take the channel. The flanges of said channel may be tied to the flanges 103 as by bolts 105.

Springs 106, 107, 108 and 109 are held to plate 101 by boxes or hangers 110, 111, 112 and 113, respectively, said springs and boxes preferably being arranged substantially symmetrically about substantially vertical and horizontal axial planes, whereby the stresses and strains arising from road shocks, traction, etc., are uniformly distributed through the several springs and spring boxes rather than being concentrated on any one or less than the whole number of springs or boxes, a condition which is of obvious advantage.

Figures 1, 9:
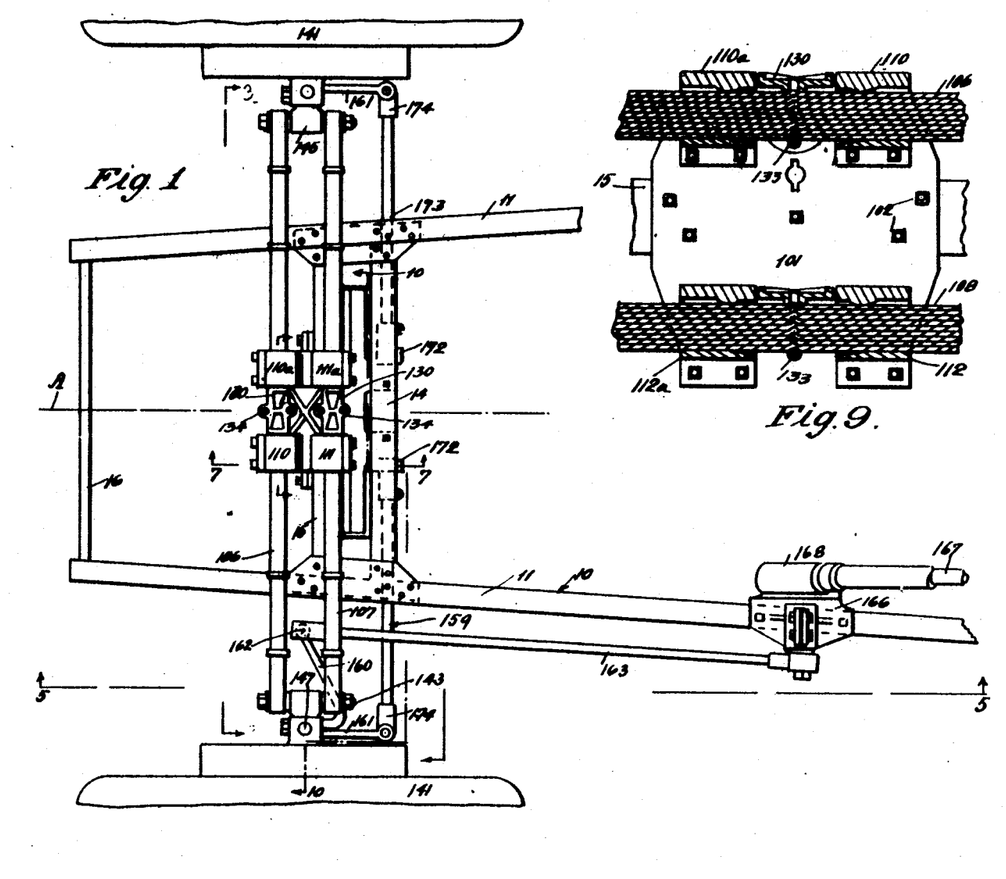
Fig. 1 is a plan view of the forward end of a vehicle frame to which an embodiment of my invention has been applied.
Fig. 9 is a section on line 9—9 of Fig. 7.
Figures 3, 5, 7, 8:
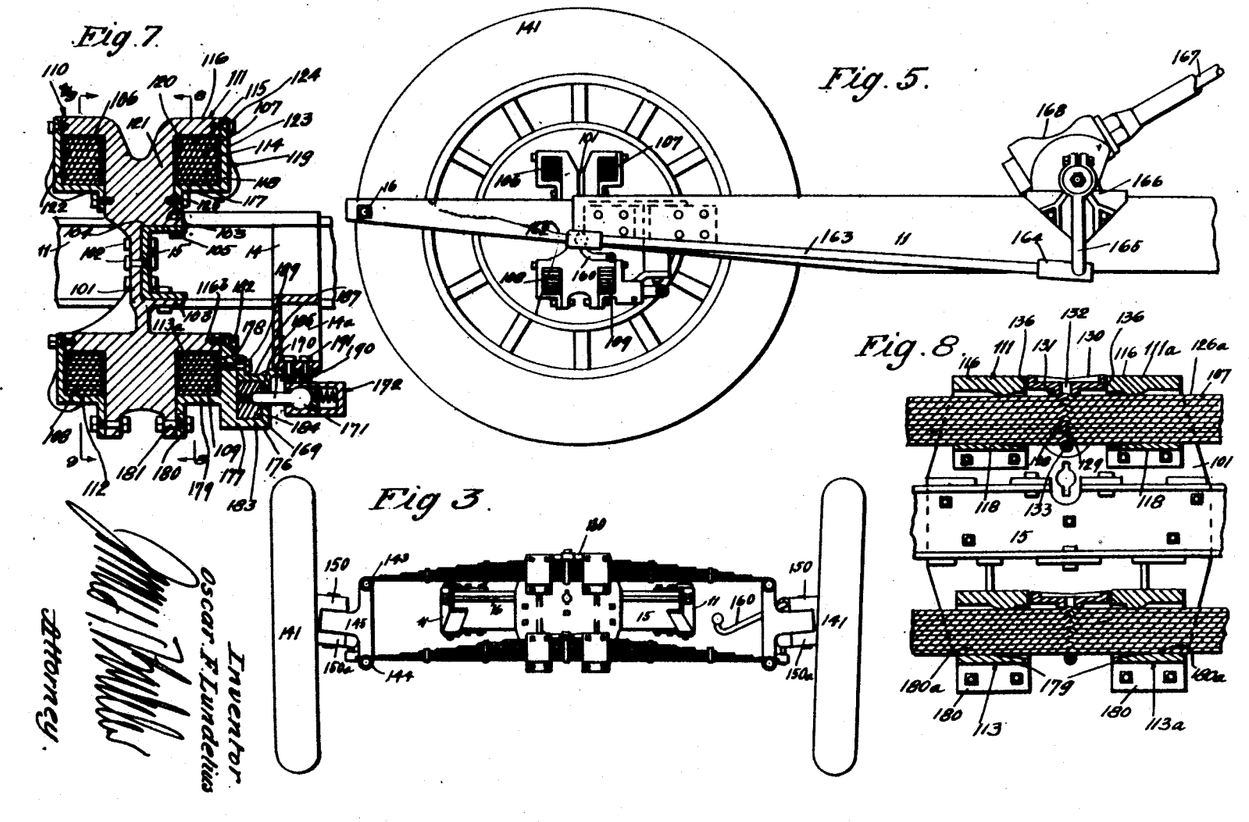
Fig. 3 is a reduced view of Fig. 1 as viewed from the left thereof.
Fig. 5 is a section on line 5—5 of Fig. 1.
Fig. 7 is an enlarged fragmentary section on line 7—7 of Fig. 1.
Fig. 8 is a section on line 8—8 of Fig. 7.

Each of the boxes so far designated has an axially alined, companion box, designated by the same numeral with the exponent "a" (see Figs. 1 and 9) the boxes of each pair being horizontally equi-spaced from axis A. Since the several pairs of boxes and spring leaf assemblies are substantially identic, I will describe but one of each in detail, choosing for this purpose the pair of boxes 111, 111[a] and the spring 107 (Figs. 7 and 8). Each box defines a substantially rectangular opening 114, the upper and lower defining walls thereof being presented by the lower face 115 of the horizontal plate flange 116, and the upper face 117 of the horizontal arm 118 of detachable cap 119, respectively. Opening 114 is also defined by the rearward face 120 of plate boss 121, and the forward face 122 of vertical cap arm 123. Cap 119 is detachably secured to the plate boss by bolts 124 and 125 which are threaded into flange 116 and the lower end of the boss, respectively.

The individual leaves 126 of spring 107 are clipped in the usual manner as at 127, and are provided with registering, centrally arranged nibs and recesses 128 and 129, respectively, whereby the leaves are held against appreciable relative longitudinal movement. A positioning block 130 is provided with a depending boss 131 which engages the upper face of the uppermost leaf 126[a], said boss being provided with central apertures 132 into which the nib 129 on said uppermost leaf extends. U-bolt 133 extends about the spring leaves and through ears 134 on opposite sides of block 130 (Fig. 1), and nuts 135 are taken up on this bolt to draw the spring leaves and block closely together. The block is positioned between the opposed side edges 136 of the flanges 116 of the companion boxes, said edges thus serving as shoulders which limit the longitudinal movement of the block and hence bodily movement of the spring longitudinally with respect to plate 101, though the block is capable of vertical movement as the spring flexes.

The drawings clearly show the similarity between the boxes of the front and rear spring systems, it being evident that the springs at the front of the car function as do those at the rear. Therefore, I will not enter into a detailed discussion of the boxes carried by plate 101 and the action of the spring supported thereby.

One of the leaves of each spring, preferably the lowermost one, though this is not at all necessary, is pivotally connected either to pin 143 or 144, carried by one of the wheel plates 145. The connections are such that flexure of the springs causes parallel, vertical movement of the two wheel plates and the wheels. The wheel plates and their connections with the wheels being identical, I will describe but one in detail. A given wheel plate carries an outwardly extending, angular knuckle boss 146 which supports an inclined knuckle pin 147, a key 148 extending through the boss and pin to hold them against separative movement. Knuckle member 149 has vertically spaced, angular arms 150 and 150ª which are bushed at 151 to take pin 147, and this member includes a plate portion 152 and a spindle portion 153, the latter preferably being inclined downwardly with respect to the horizontal. Each wheel 141 is mounted for rotation on its associated spindle 153 through the usual hub member 154, nut 155 holding the wheel to the spindle, and roller bearings 156 being interposed between the hub and spindle.

Member 149 carries a plate 157 upon which usual, internal expanding brake mechanism (not shown) is adapted to be mounted and which mechanism is adapted to coact with the wheel carried brake drum 158.

From the above, it will be seen that when wheels 141 strike road obstructions and therefore cause a flexure of the supporting springs, said wheels are carried through substantially vertical paths, the wheel plates being maintained substantially in parallel relation.

However, it will also be apparent that as plates 145 move vertically that the horizontally measured distance between the wheels or wheel plates varies, and since it is necessary for steering purposes that said wheels or wheel plates be connected by a tie bar, special provision must be made to compensate for this variation in distance, since otherwise the tie bar would be exposed alternately to excessive strains of longitudinal compression or tension, leading to crystallization of the bar and comparative early failure thereof. It will be readily understood that failure of said bar may very readily result disastrously, and therefore my means for compensating this variational distance is a very important feature. Generally, this compensation is provided by the use of an articulated or jointed tie bar which will be hereinafter described with some particularity, said bar being indicated generally at 159.

The upper arm 150 of the left-hand member 149 carries a usual drag link arm or crank 160, while the lower arms 150ª of both members 149 carry rearwardly extending arms 161. Drag link arm 160 is connected through usual universal joint 162 to drag link 163, the rearward end of the latter being connected through universal joint 164 to steering arm 165. The steering arm is mounted for pivotal movement in the usual manner on the frame carried casting 166 and is adapted to be actuated by steering post 167 through usual steering gears (not shown) within steering gear case 168. Longitudinal movement of link 163 due to actuation of the steering post 167 serves to swing member 149 and hence left hand wheel 141 about its pin 147, and tie bar 159, which connects the wheel arms 161, imparts like movement to the other dirigible wheel.

Tie bar 159 is made up of a normally central sliding block 169 from which extend rearward posts or arms 170 (Fig. 7) said arms being equi-spaced from axis A when wheels 141 are straight ahead, and carrying ball members 171 of the universal joints indicated at 172. The complementary parts of these joints are provided on the inner ends of bar sections or rods 173, the outer ends of said rods or sections being connected through universal joints 174 to steering arms 161.

Elongated block 169 is adapted to slide longitudinally through the horizontally extending way 175 provided by the two-part guide casting 176. One part 177 of this casting may comprise the cap for spring boxes or hangers 113 and 113ª, the vertical extent 178 of the casting part comprising one of the vertical walls of each box, and the horizontal extensions 179 comprising the bottom wall thereof. The upper faces 180ª of said extensions are fashioned in a manner similar to that described in connection with faces 117 of the upper boxes, (see Fig. 8). Horizontal extensions 179 preferably have depending flanges 180 which are secured at 181 to plate 101; and vertical extensions 178 of the casting part are secured at 182 to the horizontal plate flanges 116ᵇ, similar to flanges 116. Casting part 177 also includes a rearwardly extending horizontal flange 183 having an upturned lip 184, and this flange and lip together with the horizontal portion 185 and down-turned lip 186 of casting-part 187 define way 175, lips 184 and 186 being vertically spaced to provide a longitudinally extending way 188 for the passage of arms 170. Part 187 is bolted to part 177 at 189 and has rearward, horizontal extensions 190 which are bolted at 191 to cross member 14.

The two part casting 176 thus has the threefold function of providing caps for the lower spring boxes or hangers, a guide for sliding block 169, and a connection between plate 101 and frame 10 through cross member 14 whereby said casting is adapted to act as a torque rod for plate 101.

The tie bar is so fashioned that when the dirigible wheels are pointing straight ahead, block 169 is in such position with respect to casting 166 that arms 170 or joints 172 are substantially equi-distant from the transverse axial plane E (Fig. 10) of the spring system, and the rods 173 are substantially parallel with the springs. The jointing of the tie bar is such that during spring flexure, rods 173 move pivotally in a manner more or less to follow the springs and remain substantially parallel thereto so the relation between the horizontally measured distance between a given plate 145 and plate 101 and between a given pair of joints 172 and 174 remains substantially constant.

Figure 10:
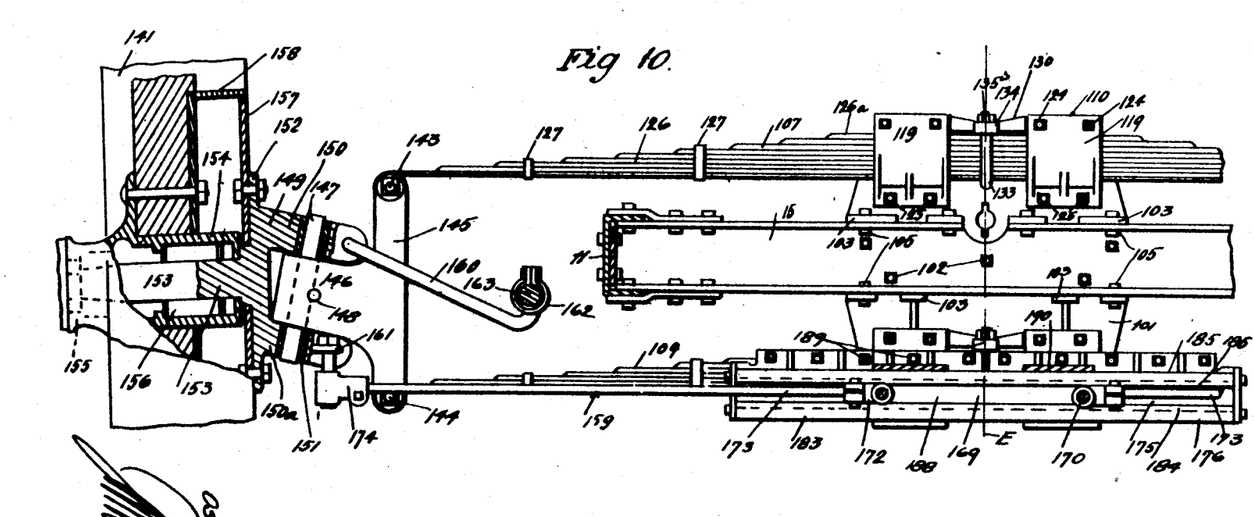
Fig. 10 is a section approximately on broken line 10—10 of Fig. 1.

In other words, the rods 173 are so proportioned and pivoted that they swing substantially parallel with the springs during approximate pivotal movement of the latter with respect to the spring boxes, joints 172 being substantially at the centers of spring flexure, which centers are found to be approximately at points spaced outwardly from the centers of the spring boxes, as is apparent in Fig. 10. The general proportion and arrangement of parts shown in this figure have been found under actual tests to give satisfactory results, the rods 173 not being placed under appreciable longitudinal compression or tension during spring flexure.

When both wheels strike road obstructions simultaneously in a maner to flex both sides of the spring equally, block 169 remains stationary and the rods 173 merely swing in opposite directions about posts 170. When only one wheel encounters a road obstruction the spring ends at that side flex more pronouncedly than do the spring ends at the other side of plate 101 and under such conditions block 169 has slight longitudinal movement, but this movement is desirable rather than undesirable since it shifts the tie bar in a manner to compensate the lessened flexure of the spring at the other side of the mounting and therefore causes the maintenance of the wheels in a substantially parallel condition without over-stressing either rod 173.

Of course, when the left-hand wheel (as viewed in Fig. 10) is swung about its pin 147 due to actuation of crank 160, the associated rod 173 is moved longitudinally, and this movement is imparted through block 169 to the opposite rod 173 so the right hand wheel is moved equally and the two wheels are maintained in correct relationship.

It will be seen that wheel plates 87 and 145 provide independent supporting members for one of a pair of wheels, in contradistinction to the usual, rigid axle which supports both wheels.

It will be understood the drawings and description are to be considered merely as illustrative of and not restrictive on the broader claims appended hereto, for various changes in design, structure and arrangement may be made without departing from the spirit and scope of said claims.

I claim:

1. A mounting for connecting a spring to a spring supported frame, embodying a pair of spaced, axially alined boxes adapted to take the spring at two longitudinally spaced points therealong, and spring bearings within said boxes shaped to allow relatively free spring flexure in one direction and to allow only relatively restricted spring flexure in the opposite direction.

2. A mounting for connecting a spring to a spring supported frame, embodying a pair of spaced, axially alined boxes adapted to take the spring at two longitudinally spaced points therealong, and spring-bearings within said boxes shaped to allow relatively free spring flexure in one direction and to allow only relatively restricted spring flexure in the opposite direction, and means coacting with said boxes and spring adapted to limit movement of the spring longitudinally through said boxes.

3. A mounting for connecting a spring to a spring supported frame, embodying a pair of spaced, axially alined boxes adapted to take the spring at two longitudinally spaced points therealong, said boxes being shaped to allow relatively free spring flexure in one direction and to allow only relatively restricted spring flexure in the opposite direction, each of said boxes embodying a plurality of walls, defining a substantially rectangular opening through which the spring is adapted to extend, and a lug depending from the upper wall of the opening into engagement with the top of the spring, there normally being clearance between said spring and upper wall at one side of the lug.

4. A mounting for connecting a spring to a spring supported frame, embodying a pair of spaced, axially alined boxes adapted to take the spring at two longitudinally spaced points therealong, said boxes being shaped to allow relatively free spring flexure in one direction and to allow only relatively restricted spring flexure in the opposite direction, each of said boxes embodying a plurality of walls defining a substantially rectangular opening through which the spring is adapted to extend, and a lug depending from the upper wall of the opening into engagement with the top of the spring, there normally being clearance between said spring and upper wall at one side of the lug, and there being provided normal clearance between the bottom walls of the boxes at their inner, opposed ends.

5. In a mounting for connecting a spring to a spring supported frame, a box rigidly connected to the frame and embodying a plurality of walls defining a substantially rectangular opening through which the spring is adapted to extend, and a stationary lug depending from the upper wall of the opening into engagement with the top of the spring, there normally being clearance between said spring and upper wall at one side of the lug.

6. In a mounting for connecting a spring to a spring supported frame, a box rigidly connected to the frame and embodying a plurality of walls defining a substantially rectangular opening through which the spring is adapted to extend, and a stationary lug depending from the upper wall of the opening into engagement with the top of the spring, there normally being clearance between said spring and upper wall at both sides of the lug.

7. A mounting for connecting a spring to a spring supported frame, embodying a pair of spaced, axially alined boxes adapted to take the spring at two longitudinally spaced points therealong, said boxes being shaped to allow relatively free spring flexure in one direction and to allow only relatively restricted spring flexure in the opposite direction, each of said boxes embodying a plurality of walls defining a substantially rectangular opening through which the spring is adapted to extend, and a lug depending from the upper wall of the opening into engagement with the top of the spring, there normally being clearance between said spring and upper wall at one side of the lug, the bottom walls of the boxes inclining inwardly and downwardly from a point intermediate their ends to provide normal clearance between the bottom of the spring and portions of the bottom walls.

8. A mounting for connecting transverse springs to a substantially rectangular vehicle frame, embodying a pair of arms secured to the sides of the frame and extending rearwardly from one end of the frame, a suspension member connected to and supported from the frame through said arms, and spring hangers carried by the suspension member.

9. A mounting for connecting transverse springs to a substantially rectangular vehicle frame, embodying a pair of arms secured to the frame and extending rearwardly from one end thereof, a suspension member connected to and supported from the frame through said arms, and a pair of spaced, axially alined hangers carried by the suspension member and adapted to take the spring at two longitudinally spaced points therealong, the hangers being adapted to allow relatively free spring flexure in one direction and to allow only relatively restricted spring flexure in the opposite direction.

10. A mounting for connecting a spring to a spring-supported frame, embodying a suspension member supported by the frame, a pair of spaced, axially alined hangers carried by the suspension member and adapted to take the spring at two longitudinally spaced points therealong, the hangers being adapted to allow relatively free spring flexure in one direction and to allow only relatively restricted spring flexure in the opposite direction.

11. A mounting for connecting transverse springs to a substantially rectangular frame of a vehicle, the vehicle wheels having transversely extending drive shafts, said mountings embodying a pair of arms secured to the frame and extending rearwardly from one end thereof, a yoke connected to and extending rearwardly from each arm, the yoke arms being disposed on vertically opposite sides of the shafts, a suspension member connected to and supported by said yokes, and spring hangers carried by the suspension member.

12. A mounting for connecting transverse springs to a substantially rectangular frame of a vehicle, the vehicle wheels having transversely extending drive shafts, said mountings embodying a pair of arms secured to the frame and extending rearwardly from one end thereof, a yoke connected to and extending rearwardly from each arm, the yoke arms being disposed on vertically opposite sides of the shafts, a pair of suspension members connected to and supported in spaced relation by said yokes at horizontally opposite sides of the shafts, and spring hangers carried by the suspension members.

13. A mounting for connecting transverse springs to a substantially rectangular vehicle frame, embodying a pair of arms secured to the sides of the frame at points spaced from one of the frame ends, means connecting the arms to said one end, said arms extending rearwardly from said one end, a suspension member connected to and supported from the frame through said arms, and spring hangers carried by the suspension member.

14. A mounting for connecting transverse springs to a substantially rectangular frame, embodying a pair of arms secured to the frame at points spaced from one end thereof, said arms extending convergently from said points toward and beyond said end, a suspension member positioned beyond said end and supported from the frame through said arms, and spring mountings carried by the suspension member.

15. A mounting for connecting transverse springs to a substantially rectangular frame, embodying a pair of arms secured to opposite sides of the frame at points spaced from one end thereof, said arms extending convergently from said points toward and beyond said end, means connecting said arms and said frame end, a suspension member positioned beyond said end and supported from the frame through said arms, and spring mountings carried by the suspension member.

16. A mounting for connecting transverse springs to the frame of a vehicle, the vehicle wheels having transversely extending drive shafts, said mounting embodying a pair of horizontally spaced, rearwardly extending yokes secured to the frame, the yoke arms of each yoke being disposed on vertically opposite sides of the drive shafts, a suspension member connecting and supported by the yokes, and spring-taking members on the suspension member.

17. A mounting for connecting transverse springs to the frame of a vehicle, the vehicle wheels having transversely extending drive shafts, said mounting embodying a pair of horizontally spaced, rearwardly extending yokes secured to the frame, the yoke arms of each yoke being disposed on vertically opposite sides of the drive shafts, a pair of suspension members connecting and supported in spaced relation by said yokes at horizontally opposite sides of the shafts, and alined spring-taking members on the suspension members.

18. A mounting for connecting a transverse spring to a substantially rectangular frame, embodying a pair of arms secured to opposite sides of the frame at points spaced from one end thereof, said arms extending convergently from said points toward said end, and a pair of spring mountings supported from the frame through said arms.

In witness that I claim the foregoing I have hereunto subscribed my name this first day of December, 1926.

OSCAR F. LUNDELIUS.